United States Patent [19]
Kirma et al.

[11] Patent Number: 5,998,772
[45] Date of Patent: Dec. 7, 1999

[54] INTERCONNECT SYSTEM FOR HEATING CONDUCTORS

[75] Inventors: Safa Kirma, Wedel; Heinz Stoever, Stade; Joachim Pfeiff, Neuwulmsdorf; Wolfgang Erdmann, Buxtehude, all of Germany

[73] Assignee: DaimlerChrysler Aerospace Airbus GmbH, Hamburg, Germany

[21] Appl. No.: 09/103,123

[22] Filed: Jun. 23, 1998

[30] Foreign Application Priority Data

Jun. 23, 1997 [DE] Germany ............................ 197 26 418

[51] Int. Cl.$^6$ ...................................................... H05B 3/08
[52] U.S. Cl. ......................... 219/541; 219/517; 219/528; 219/535; 219/549; 339/113; 439/281; 439/490; 524/233; 524/514
[58] Field of Search .................................... 219/517, 528, 219/535, 549, 541; 439/281, 490; 339/113; 524/233, 514

[56] References Cited

U.S. PATENT DOCUMENTS

| | | |
|---|---|---|
| 3,341,690 | 9/1967 | Commins . |
| 4,066,870 | 1/1978 | Colten . |
| 4,101,190 | 7/1978 | Schoff . |
| 4,419,569 | 12/1983 | Colten .................................... 219/528 |
| 4,639,066 | 1/1987 | Shimamiya et al. . |
| 5,510,405 | 4/1996 | Heucher et al. ......................... 524/233 |

FOREIGN PATENT DOCUMENTS

| | | |
|---|---|---|
| 0187636 | 7/1986 | European Pat. Off. . |
| 1056221 | 12/1961 | Germany . |
| 1893605 | of 1964 | Germany . |
| 8504019 | 5/1985 | Germany . |
| 4338699 | 2/1995 | Germany . |
| 8503674 | 6/1985 | United Kingdom . |

OTHER PUBLICATIONS

Excerpt of Product Catalog: "Products for Freeze Protection", Wittmann GmbH, Heidelberg, Germany.
Excerpt of Product Catalog: "Heizelemente und Widerstände," p. 17, friedr.freek GmbH.
Excerpt of Product Catalog: "bringt Wärme auf den Punkt bis 1000° C.—optimal dosiert—für Industrie und Labor", Wittmann GmbH, Heidelberg, Germany.
Excerpt of Product Catalog: "The BARTEC Group".

Primary Examiner—Philip H. Leung
Assistant Examiner—L. Fastovsky
Attorney, Agent, or Firm—W. F. Fasse; W. G. Fasse

[57] ABSTRACT

A system of interconnected heating conductors, suitable for preventing freezing of water lines in an aircraft for example, includes a plurality of heater units (1, 12, 14) electrically coupled together by respective extension cables (3) and electrical coupling elements (42). Each heater unit comprises one or more heating conductor bands, tapes or strips (2, 21, 22) connected to respective connection modules (5, 51, 52, 52', 53) at the ends thereof. The connection modules may connect together several heater bands within one heater unit, and may connect the terminal ends of the heater bands of one heater unit to the extension cables by which several respective heater units may be connected together. Each connection module includes a housing (6) enclosing an inner chamber (61) therein, and at least one electrical connector element (7) such as a crimpable connector fixed within the housing (6). The respective conductors of the heater bands (2) and of the extension cables (3) extend into the housing through lead-in openings (64) and are connected together within the housing (6) by the respective connector elements (7). A complete and reliable seal against moisture penetration is achieved by injecting a sealing compound (19) into a fill hole through the housing wall, so that the inner chamber (61) of the housing (6) is completely filled with the sealing compound (19). The sealing effect eliminates capillary action even when subjected to vibrations, shock, temperature variations, and low pressure conditions. The assembly of the connection modules is simple and economical.

37 Claims, 2 Drawing Sheets

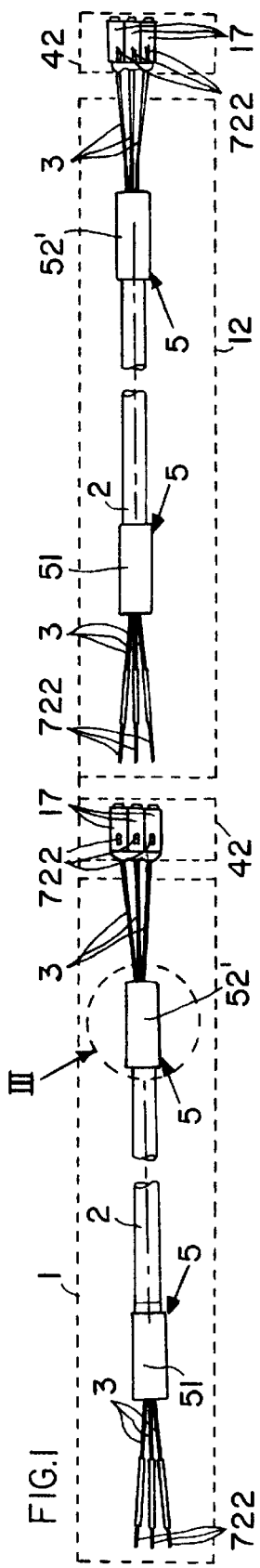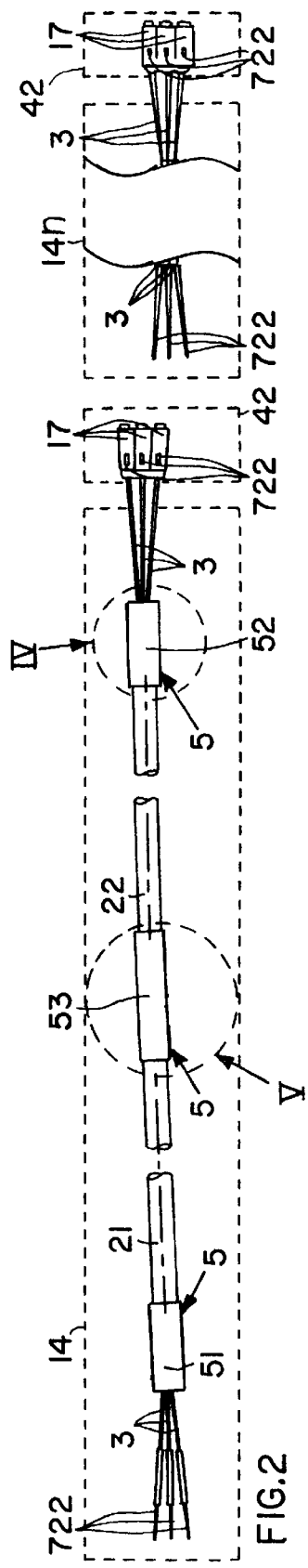

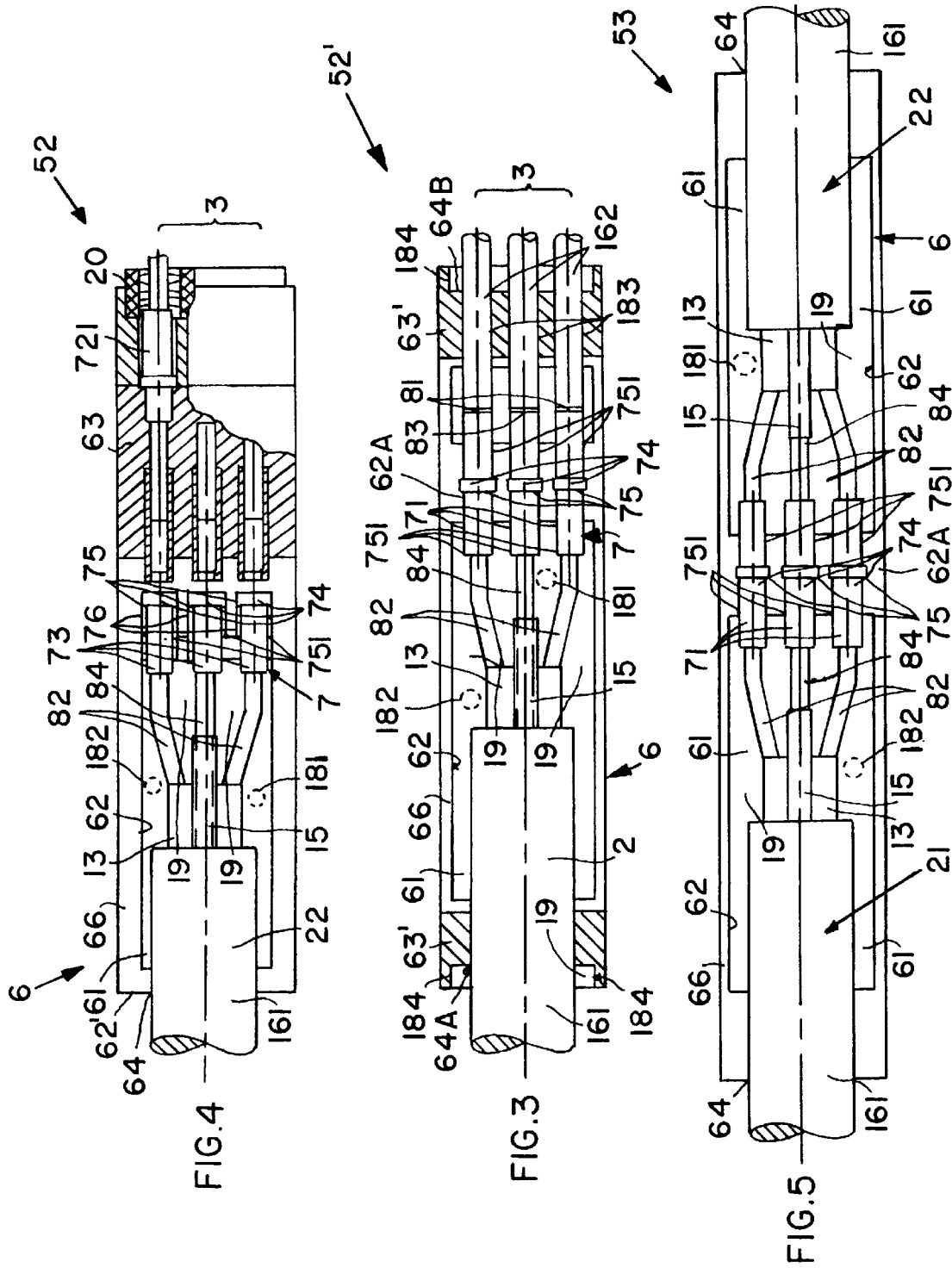

INTERCONNECT SYSTEM FOR HEATING CONDUCTORS

CROSS-REFERENCE TO RELATED APPLICATION

This application is related to the U.S. application Ser. No. 09/103,120 of the same inventors, entitled "INTERCONNECT SYSTEM FOR HEATING CONDUCTORS IN AN AIRCRAFT", filed on Jun. 23, 1998. The entire disclosure of the copending application is incorporated by reference herein.

PRIORITY CLAIM

This application is based on and claims the priority under 35 U.S.C. §119 of German Patent Application 197 26 418.2, filed on Jun. 23, 1997. The entire disclosure of German Patent Application 197 26 418.2 is incorporated herein by reference.

FIELD OF THE INVENTION

The invention relates to a system for interconnecting heating conductors such as heater bands, tapes or strips, including a plurality of heating conductor arrangements that are electrically coupled together by means of extension cables and respective electrical coupling elements, especially in an aircraft.

BACKGROUND INFORMATION

Modern aircraft include various different systems of pipes, conduits, instruments, and accessories in which various liquid products are transported. These liquid-containing components are subject to freezing temperatures during the operation of the aircraft. Therefore, it has become generally known to apply interconnected heater bands, tapes, or strips (generally called heater bands herein) onto these liquid-containing components to provide frost protection. The interconnected heater bands form a heating conductor interconnection system, which is provided with electrical power from the on-board electrical power network of the aircraft.

The known techniques for interconnecting the several heater bands involves carrying out various prescribed steps to prepare and connect the connection ends of the individual heating bands to further heater bands or to the on-board power supply network. These steps typically involve exposing the electrical conductors of the heater band by at least partially stripping the outer and inner sheaths thereof, whereby the heater element itself is made correspondingly shorter. Generally, the conductors have a length sufficient to serve as extension cables for interconnecting several heating conductors as desired. Then, an adhesive potting or sealing compound is applied over the insulation of the conductors, and then a shrinkable tubing is pushed over the insulation of the conductors and the adhesive potting compound. After the shrinkable tubing is adhesively bonded onto this structure and the adhesive potting compound has cured, the shrinkable tubing insulates and seals the transition between the conductors and the heating element at the offset or shouldered end of the inner sheath, i.e. the portion of the conductor from which the insulating sheathing has been stripped off.

The conductors may include respective braided protective or shielding conductors that are arranged to lie over the inner sheath, but that have a length shorter than the overall conductors. By subsequent measures, the ends of the strands of the protective conductor braid are combed out and twisted. Then a crimpable butt connector is used to electrically connect the twisted free end of the protective conductor braid to an additional extension conductor, by being crimped onto these two components. This additional extension conductor has a length extending to the ends of the electrical conductors of the heater band, and respective pin contacts are crimped onto the free ends of these respectively insulated conductors. A shrinkable tubing is shrunk over the electrical conductors, and then an adhesive potting compound is applied outside around the shrinkable tubing, over the transition area of the protective conductor braid at the location where the outer sheath has been removed from the heater band. The resulting structure is further covered by an additional shrinkable tubing that is shrunk into position thereon. The additional shrinkable tubing is adhesively bonded onto the underlying layered structure, and the adhesive potting compound is cured, whereby the additional shrinkable tubing then insulates the above described heater band interconnection at the offset or shouldered end of the outer sheath of the heater band. The heater band interconnection that is prepared in this manner ensures that the prescribed sealing requirements in the field of aircraft construction are achieved.

Then, the heater bands are electrically connected to each other and/or to the electrical power supply network of the aircraft as follows. First, the pin contacts that were crimped onto the free ends of the electrical conductors and onto the additional extension conductors that were connected to the protective conductor braid, are then separately inserted or plugged into a through-connect socket. Then, all of the electrical connections of the heater bands to each other and to the on-board power supply network are realized by means of the through-connect sockets.

The heater band interconnection carried out in the above described manner results in a non-uniform and unwieldy geometry and involves several applications of an adhesive potting compound and plural shrinkable tubes forming sheaths. The process for forming the connection is rather complicated and time consuming because the connection structure is formed by manually applying the adhesive potting compound, and then fitting several shrinkable tubes thereon, and finally individually drying and curing each adhesive potting compound layer separately in an oven. There is also a danger that a uniform and constant quality cannot be achieved over a series of connections, whereby the sealing properties may be negatively influenced at the extreme low pressure conditions and drastic temperature variations that prevail in the aircraft. Moreover, a danger exists that the applied shrinkable tubes may crack or tear at various offset or shouldered or stepped locations of the non-uniform geometry. In that case, the sealing of the heater band interconnection, as well as the reliability of the heater band overall, will consequently be negatively influenced, whereby the power supply reliability of an entire integrated heating conductor interconnection system can be jeopardized.

Moreover, the above described conventional technology suffers the disadvantage that the electrical conductors of the heater band, without the protective conductor braid, are functionally laid out as extension conductors. Only the protective conductor braid is connected to an additional lengthening extension conductor by means of butt connectors. In this context, the conductors must be embodied to have the proper length, e.g. be cut to the proper length, and be insulated at each one of the connections.

The above described conventional measures require a considerable amount of time, effort and expense. Moreover, the danger exists that one or more strands of the conductor will be damaged, and the surface protection can be damaged. The manual application of the adhesive potting compound onto the conductors and the subsequent sliding or pushing of the shrinkable tubes onto the arrangement also add to the technological effort and expense. The application of the adhesive potting compound is absolutely indispensable for adhesively bonding the shrinkable tubes for ensuring the sealing effectiveness and for avoiding the possibility of capillary action. As a further disadvantage, the electrical assembly of the protective conductor braid and the additional extension conductor by means of a respective butt connector does not exactly define the position and the integration of this assembly within the heater band connection. Therefore, and since the butt connector includes a through-going hole, it is not possible to avoid a complete or 100% capillary action through the crimped butt connector.

The multiple drying and curing steps required by the adhesive potting compound for adhesively bonding the shrinkable tubes by means of heating in an oven further adds to the technical complexity, effort and expense. Moreover, the heater element itself and the associated electrical conductors must be individually and collectively adhesively bonded and sealed with respective shrinkable tubes. A final heat treatment for an additional outer shrinkable tube or sheath, which provides additional sealing and the outer mechanical protection of the prepared heater band connection, further considerably increases the technological effort and expense.

For the above reasons, heater band connections cannot be economically and practically produced according to the methods and arrangements of the prior art. Moreover, a pre-fabrication of the heater bands to be installed in an aircraft cannot be economically carried out according to the above described state of the art.

SUMMARY OF THE INVENTION

In view of the above, it is an object of the invention to provide an interconnection system for heating conductors, especially in an aircraft, of the above described general type, but improved in such a manner that the structural arrangement and the fabrication technique can be simplified, while simultaneously achieving an improved sealing effectiveness and eliminating capillary action in the connections, even under the influence of vibrations, shock, temperature alternations, and low pressure conditions, to which the heating conductor interconnection system may be subjected in its installation in an aircraft. It is also an aim of the invention to provide a heating conductor interconnection system that is suitable or adaptable to other non-aircraft applications where it is necessary to thermally protect temperature sensitive systems, such as for providing frost protection and product heating. The invention further aims to provide permanent as well as temporary or removable heating conductor interconnections.

Plural heating conductor arrangements are to be simply integrateable to form a heating conductor interconnection system, whereby the individual heating conductor arrangements are to be economically manufacturable, easily installable, and also easily replaceable if it later becomes necessary in the completed heating conductor interconnection system. Also, the yield rate shall be increased and the reject rate shall be reduced to a minimum in the production of the heating conductor interconnection system. The invention further aims to avoid or overcome the other disadvantages of the prior art, and to achieve additional advantages, as apparent from the present description.

The above objects have been achieved in a system of interconnected heating conductor arrangements according to the invention, wherein the heating conductor arrangements are electrically coupled together by means of respective extension conductors and electrical coupling elements. Each respective heating conductor arrangement (or heater unit) includes individual connector modules connected to a respective heater band, strip or tape (generally referred to as heater bands herein). Each connector module respectively includes an electrical connection housing as a component part thereof, wherein the housing includes at least one housing lead-in opening. Each connection module further includes at least one electrical connector element, which may specifically be embodied as a crimpable element, arranged within the connection housing. The interior space or inner chamber of the connection housing is filled on all sides with a sealing medium or compound. The respective heater band comprises a heating conductor enclosed by an outer sheath. The respective extension cable comprises at least one electrical conductor enclosed in an insulating sheath.

The outside or free ends of the respective extension conductors are connected to a respective electrical coupling element, which is arranged between each pair of heating conductor arrangements that are to be coupled together. The heater band and the extension conductor are arranged to extend guidedly through the housing lead-in openings, whereby at least the offset or shouldered area thereof (i.e. the area at which the insulation has been stripped off) is located within the inner chamber of the connection housing. The respective inside or fixed end of the individual electrical conductor or conductors of each extension cable and the conductor or conductors of the heater band are respectively connected to the individual electrical connecting element within the connection module housing. The individual connecting element is fixed in a receiving groove that is recessed or let into the interior wall of the connection housing. The connecting element is surrounded by the sealing medium, whereby at least the connection area of the individual connecting element that is located in the inner chamber of the connection housing is surrounded on all sides thereof by the sealing medium. Furthermore, the inner chamber of the connection housing and the offset region of the heater band and/or of the extension conductor are respectively surrounded on all sides by the sealing medium, and thereby are completely sealed against the penetrating entry of moisture or liquid, even under extremely low pressure conditions, for ensuring that the arrangement meets all sealing requirements.

BRIEF DESCRIPTION OF THE DRAWINGS

In order that the invention may be clearly understood, it will now be described in connection with example embodiments, with reference to the accompanying drawings, wherein:

FIG. 1 is a schematic overview of a heating conductor interconnection system according to the invention, including two electrically couplable heating conductor arrangements or heater units;

FIG. 2 is a schematic overview of a heating conductor interconnection system including a plurality of electrically couplable heating conductor arrangements, which each include a plurality of heater bands;

FIG. 3 is an enlarged detail view of a connection module housing, shown opened and in section, at the detail area III in FIG. 1, representing a permanent, non-removable connection between a heater band conductor and an extension conductor;

FIG. 4 is an enlarged detail view of another connection module housing, shown opened and in section, at the detail area IV in FIG. 2, representing a permanently connected heater band conductor and a removably connected extension conductor;

FIG. 5 is an enlarged detail view of an intermediate connection module, shown broken open and in section, at the detail area V in FIG. 2, for permanently interconnecting two heater bands in a heating conductor arrangement.

DETAILED DESCRIPTION OF PREFERRED EXAMPLE EMBODIMENTS AND OF THE BEST MODE OF THE INVENTION

A heating conductor interconnection system can be installed in an aircraft to provide prophylactic freeze protection and product heating, of frost endangered pipes or conduit systems and their related accessories installed in a fuselage of the aircraft, and particularly, for example, for heating the fresh water supply system and the waste water system to prevent freezing of the water therein. The heating conductor interconnection system is embodied in such a manner that any defective or failing individual section or component thereof may simply and without problems be removed from the system and be replaced by a properly functioning component.

As shown in FIGS. 1 and 2, for example, the heating conductor interconnection system generally comprises a plurality of heating conductor arrangements or heater units 1, 12, 14 and 14n which may be electrically coupled together by means of extension cables or conductors 3 via respective coupling elements 42, whereby the heating conductor arrangements are connected in series to form a heating conductor chain. Each respective heating conductor arrangement or heater unit 1, 12, 14 and 14n comprises individual connection modules 5, 51 and 52 or 52' respectively connected to the ends of a heater band, tape or strip 2. In this context, the heater band 2 may be any known electrical heating conductor arrangement, for example, including one or two electrical conductors having a prescribed resistance so that an electrical current flowing therethrough dissipates a prescribed amount of heat. The heater band may alternatively function with a given resistance between the two electrical conductors of the heater band. The heater bands 2, 21 or 22 can be embodied in the form of any known resistance or parallel heating band, strip or tape, which may comprise one or more heating conductors therein. The heater band configuration may either be flat or round or have any other desired cross-section. Each respective heater band 2, 21 or 22 may be designed and embodied so as to have a self-limiting or self-regulating heat output, whereby various heater bands in the overall system may be designed to operate in different temperature ranges as the particular application may require at different locations to be heated. In any particular case or application, the heater bands may be high temperature or low temperature heater bands. Through the use of the connection modules 5, 51, 52, 52' or 53, it is a simple matter to arrange and install the modular system including the particular different heater bands as required at different locations.

Each respective heater band 2, 21 or 22 of the individual heater units 1, 12, 14 and 14n is respectively secured to the pipe or conduit of the fresh water system or waste water system that is to be heated. Each individual heater unit 1, 12, 14 and 14n may comprise a plurality of the connection modules 5 connected to one or more heater bands 2, or may only comprise a single connection module 5 that is connected to a heater band. In this case, this single connection module 5 in a respective heating conductor arrangement is of a type to be installed at the end of a heating conductor chain. In the last heater unit in such a chain, there is no need for a further or second connection module 5 at the end thereof.

Otherwise, the connection modules 5 respectively form the input or output ends of the serially connectable heater units 1, 12, 14 and 14n, and for this purpose are equipped with or connected to one or more respective extension conductors 3. The electrical coupling or interconnection of the respective heater units 1, 12, 14 and 14n to each other is carried out via a coupling element 42 to which the one or more extension conductors 3 are connected.

The individual or single connection module 5 arranged on one end of a respective heater unit that is to be installed at the end of a heater unit chain is connected at its input end to a last or terminal extension conductor 3, which in turn is electrically coupled to a last or terminal coupling element 42 arranged upstream thereof in circuit. The opposite or free end of the heater band 2 connected to this last connection module 5, and forming the end of the heater band chain, is provided with a heater band end cap. At this free end, the electrical conductors of the terminal heater band 2 are not connected to each other, but rather provide an open termination for the heater band electrical circuit of the serially connected heater units 1, 12, 14 and 14n. The heater band end cap electrically insulates these two electrical conductors from each other, and is surrounded on all sides by a sealing medium 19 that is used as an adhesive sealing or potting compound (referred to simply as an adhesive potting compound 19 herein, as an example). This adhesive potting compound serves to completely seal the end cap against penetration by moisture and liquid, even under extreme low pressure conditions so as to ensure that the sealing requirements are met. The potting compound is also electrically and thermally insulating, and may preferably comprise a two-component curable resin system based on at least one of epoxies and polyamides.

FIG. 1 shows a representative example of the heating conductor interconnection system including two electrically coupled heating conductor arrangements or heater units 1 and 12, which are connected together in a series circuit. Both of the heater units 1 and 12 have the same respective construction. Namely, each heater unit comprises a respective heater band 2 with respective first and second connection modules 51 and 52' directly connected to the two opposite ends of the heater band 2. Two extension cables 3 are respectively connected to the two connection modules 51 and 52', respectively at the input or the output side of the respective heater unit 1 and 12. The extension cable 3 comprises three flexible single-poled electrical conductors, respectively having a pin contact 722 crimp-connected onto the stripped or de-insulated free ends of the three electrical conductors. The respective pin contacts 722 of the individual conductors 3 are then inserted and received in respective corresponding through-connect sockets 17, whereby three of these through-connect sockets 17 are integrated into the coupling element 42.

The individual electrical conductors of the extension cable 3 connected to the second connection module 52' of the first heater unit 1 are thereby respectively connected to the individual conductors of the extension cable 3 of the first connection module 51 of the second heater unit 12, by means of the above described interconnection of the respective pin contacts 722 in the respective individual through-connect sockets 17. In this manner, the electrical coupling between the two heater units 1 and 12 is achieved.

The particular details of the construction or arrangement of the connection modules 51 and 52 or 52' of the individual heater units 1 and 12 according to FIG. 1 can be embodied either according to the example of FIG. 3 or according to the example of FIG. 4, which will each be described in detail below, whereby the arrangement relates to two connection modules 51 and 52' connected to a heater band 2 as shown in FIG. 1. As an example, the connection module of FIG. 3 will be described as applying to the overall system of FIG. 1, while the connection module of FIG. 4 will be described as applying to the overall system of FIG. 2.

FIG. 2 shows an example of a system including a heating conductor arrangement or heater unit 14 including two heater bands 21 and 22 respectively interconnected with three connection modules 51, 52 and 53. The modules 51 and 52 are end modules for connecting the heater unit 14 to other heater units via the extension cables, while the module 53 is an intermediate connection module for permanently connecting together adjacent heater bands 21 and 22 within the respective heater unit 14. The heater bands 21 and 22 generally correspond to heater band 2 and may also be referenced by reference number 2, while the reference numbers 21 and 22 simply indicate that there are two of these heater bands or two heater band parts interconnected by the connection module 53. The illustrated third heater unit 14 is connected to a further nth heater unit 14n by means of a respective electrical coupling element 42. The internal construction of the nth heater unit 14n is shown open, i.e. omitted, because it may be embodied according to any of the FIGS. 3, 4 or 5, as will be described below. The designation of the heater unit 14n as the "nth" heater unit is intended to indicate that the heater unit chain may be formed of any desired number of series connected heater units 1, 12, 14 and up to any desired nth heater unit 14n.

In comparison to the embodiment of FIG. 1, the heater unit 14 comprises two heater bands (rather than only one), and a third or intermediate connection module 53 connected between the two heater bands. While the connection modules 51 and 52 are still provided at the respective opposite ends of a heater unit, the heater unit now includes two heater bands 21 and 22 securely and permanently connected together by the third connection module 53 therebetween. The first connection module 51 is connected to an outboard end of the first heater band 21, while the second connection module 52 is connected to an outboard end of the second heater band 22, in a permanent and non-removable manner. Respective extension cables 3 are connected to the first and second connection modules 51 and 52 provided at the input and output ends of the third heater unit 14. In turn, the extension cables 3 are electrically coupled serially to a preceding or a following heater unit, such as the nth heater unit 14n, in the same manner as described above in connection with FIG. 1.

The present embodiment of such a heater unit 14 is especially useful and interesting in the event it becomes necessary to repair a heater band 2, 21 or 22 suffering an electrical failure such as a short-circuit, or a mechanical damage. In that case, the damaged or failing portion of the heater band 2, 21 or 22 can be localized over the length of the installed heater band, and the damaged portion can simply be cut out of the heater band 2, 21 or 22, whereby two shorter heater band sections will remain on either side of the cut-out portion. These two shorter heater band sections can then be connected to each other by the intermediate connection module 53. In this manner, it is relatively simple to repair a damaged or malfunctioning heater band 2, 21 or 22 even while it remains installed in its ordinary position.

In all of the embodiments according to FIGS. 3 to 5, the respective connection module 5, 51, 52, 52' or 53 comprises an electrical connection housing 6 that is a component part of the connection module and that is formed of an open housing underpart 66 and a housing cover or lid (which is not shown). The housing cover may be a substantially flat plate, or a three-dimensionally formed cover with a hollow space therein aligning with the inner chamber formed in the underpart 66. The cover is laid over or arranged on the housing underpart 66 after the respective electrical connection has been carried out within the connection housing. The housing cover or lid is connected to the housing underpart 66 in a force-locking or form-fitting manner. The two parts of the housing may respectively be made of a non-conducting plastic, and may be positively bonded together, for example by means of high frequency welding such as ultrasonic welding. Alternatively, the housing cover may be tightly held and sealed against the housing underpart 66 by means of a clamping arrangement or bail around the housing. It is also possible to use screws to tightly secure the housing lid onto the top edge or rim of the housing wall of the housing underpart 66.

In its assembled and secured final condition, the connection housing 6 has a rectangular, quadratic or parallelepiped block form, whereby the end faces of the housing underpart 66 have at least one housing lead-in opening 64 for leading or guiding the heater bands 2, 21 or 22, or the respective extension cables 3 into the connection housing 6. Thereby, the number of the lead-in openings 64 corresponds to the respective number of the conductors or cables to be guided into the housing on the input and output sides thereof.

One or more individual electrical connecting elements 7 embodied as crimpable elements, are arranged within the open housing underpart 66 of the respective connection module 5, 51, 52, 52' or 53. The connection zone or region of each one of these crimpable connecting elements 7 is crimped for establishing the electrical connection to the respective heater band 2, 21 or 22 or extension cable 3. The number of the connecting elements 7 provided in the housing 6 corresponds to the number of the electrical conductors to be connected. More particularly, the connecting elements 7 are embodied as crimpable butt connectors 71, which are arranged in the inner chamber 61 in respective lengthwise and crosswise grooves formed in the inner wall 62 of the housing.

The connection housing 6 may further comprise a respective massive housing end block 63 forming an end face wall thereof as shown in FIG. 4. The end block is thicker, and may also be higher, than the remaining housing wall. The end block 63 has contact chambers extending parallel to the lengthwise axis therein, and each respective contact chamber receives therein at least a portion of a connector element 7 embodied to include a socket and/or pin contact 73 or 721. In this embodiment, the crimpable zone or portion of the element 7 including the socket contact 73 is either located within the inner chamber 61 of the connection housing 6 or at least it projects into this inner chamber 61, whereby the contact itself is secured or held by a respective retainer ring or clip 76. The pin contact 721 is received in the respective contact chamber of the massive housing end block 63 and is secured by a separate retaining ring or clip 76.

In this context, in the embodiment according to FIG. 3, the respective electrical conductors of the extension cable 3 are guided through a bored hole through the massive housing end block 63'. The electrical connection of the respective individual electrical conductors with the respective connecting elements 7 is achieved by leading and inserting the stripped, i.e. de-insulated, conductor ends into the respective end crimping zones of the connector elements 7 and then crimping the respective crimping zones onto these conductor ends using a suitable crimping tool.

After the individual electrical conductors of the heater band 2 have been connected to the connector element 7, which is fixedly positioned within the open housing underpart 66, the individual connector element 7 or at least the connection region or zone thereof, together with the electrical conductors connected thereto, are completely coated and surrounded on all sides by an adhesive sealing or potting compound 19. This applies similarly to the butt connector 71 that is arranged in the lengthwise receiving groove 751 as shown in FIGS. 3 and 5, whereby these butt connectors 71 are at least partially surrounded by adhesive potting compound 19. Furthermore, the offset portion of the heater band 2, 21 or 22, i.e. the stripped or de-insulated portion, which is arranged within the open housing underpart 66, as well as the portion of the outer sheath 161 of the heater band 2, 21 or 22 protruding into the housing, and also the offset portions of the electrical conductors of the extension cable 3 in the specific case of FIG. 5, are coated and surrounded on all sides by the adhesive posting compound 19. In this manner, the recited components are completely sealed against moisture and liquid penetration, even under conditions of extreme low pressure, in order to ensure that all sealing requirements are met.

After the above described electrical connections have been formed, and the housing cover has been secured to the housing underpart 66 as described above, the interior space or inner chamber 61 of the connection housing 6 is filled completely on all sides and in all vacant locations with adhesive potting compound 19. In order to fill the potting compound 19 into the inner chamber 61 of the housing 6, one possibility is to provide a through-going bored fill hole 181 in the housing underpart 66. Further preferably, a vent hole 182 is also provided in the housing underpart 66. Thus, in order to fill the interior space 61, the adhesive potting compound 19 is filled or injected into the fill hole 181 while air is vented out of the vent hole 182. Once the adhesive potting compound 19 continuously comes out of the vent hole 182, this signals that the entire interior chamber 61 of the connection housing 6 has been filled and the connector elements 7 have been completely surrounded on all sides by the adhesive potting compound 19. This further ensures that no air pockets are enclosed or sealed in by the adhesive potting compound 19.

It is further noted that the above mentioned housing lead-in openings 64 may additionally be provided with external recesses 184 if desired, for example in the embodiment according to FIG. 3. These recesses 184 are at least partially formed or let into the massive housing end block 63' at the end faces of the connection housing 6, outside of the inner chamber 61 of the housing 6. In the final assembled condition, these recesses 184 are also completely filled with the adhesive potting compound 19 around the heater band or extension cable passing therethrough, so that these lead-in openings at the ends of the housing are also completely and reliably sealed against the penetration of moisture or liquid.

FIG. 3 shows an example arrangement of a single connection module 5, 51 or 52', and particularly the second connection module 52', which is permanently connected to and interconnects the heater band 2 and the extension cable 3 of the first heating conductor arrangement 1 of FIG. 1. This extension cable 3 may be further connected through the coupling element 42 to the next or second heating conductor arrangement 12. In this case, the coupling element 42 provides the electrical coupling or connection between the second connection module 52' of the first heater unit 1 to the first connection module 51 of the second heater unit 12. Alternatively, the coupling element 42 can be connected to the electrical power supply network of the aircraft, whereby the coupling element 42 would provide the electrical connection between the second connection module 52' of the first heater unit 1 and the on-board electrical power supply of the aircraft.

In this embodiment of FIG. 3, the heater band 2, 21 or 22 and particularly the heater band 2, is embodied as a generally known self-limiting parallel heater band, which may similarly be used for the example embodiments according to FIGS. 4 and 5. The structural arrangement of the heater band 2, 21 or 22 comprises two parallel extending conductors 82 that are respectively formed of tinned copper strands and that carry the electric current during operation of the heater. These conductors 82 are completely embedded in a self-regulating synthetic material or plastic heater element, which is not shown in particular, but which is generally known. Furthermore, the respective heater band 2, 21 or 22 comprises an inner sheath 13 consisting of a plastic insulation layer that surrounds the heater element, as well as an additional protective conductor 84 in the form of a braided tube of tinned copper strands that jackets and encloses the inner sheath 13. The protective conductor 84 does not carry a current during normal operation, but rather provides shielding and grounding in the event of a disruption or break in the heater band. Outside of this protective conductor braid 84, an outer sheath 161 made of plastic or the like provides the outer surface cover and closure of the heater band construction by completely jacketing and enclosing the protective conductor braid.

The connection module 5, 51 or 52' according to FIG. 3 essentially comprises the above mentioned quadratic block-shaped connection housing 6, including a housing underpart 66 having two massive housing end blocks 63' at opposite end faces thereof. The housing end blocks 63' facing or bounding the inner chamber 61 of the connection module 5, 51 or 52' are formed into the end face wall of the connection housing 6, whereby the housing inner wall 62 of the housing underpart 66 encloses or bounds the open space of the inner chamber 61 of the housing 6. Different housing lead-in openings 64 are provided at the two opposite ends of the housing underpart 66 by being formed in and extending through the housing end blocks 63' and the respective adjoining inner wall of the chamber 61, in the form of holes extending substantially parallel to the lengthwise axis of the housing.

In this context, on the left end of the housing as shown in FIG. 3, the housing lead-in opening 64A comprises a single hole or opening through which the heater band 2 is guided into the inner chamber 61 of the housing underpart 66. On the opposite or right-hand side of the housing, the housing lead-in opening 64B includes three guide holes 183 extending parallel to the housing lengthwise axis through the housing end block 63 and the associated inner wall of the housing. The end portions 162 of the three individual flexible electrical conductors that are integrated together to form the extension cable 3 are individually guided through these three guide holes 183 into the inner chamber 61 of the housing underpart 66. Three individual crimpable butt connectors 71 are provided as connector elements 7 in the inner chamber 61.

The inner wall 62 of the housing 6 includes a partial divider wall or protrusion 62A extending into the inner chamber 61 from the inner wall 62. This partial divider wall or protrusion 62A has three receiver grooves 751 formed therein so as to extend in a direction parallel to the lengthwise axis of the housing 6. The three grooves 751 are arranged side-by-side parallel and adjacent to one another. The three butt connectors 71, and particularly the crimping zones thereof, are respectively received in the three lengthwise receiver grooves 751, whereby the free ends of the butt connectors 71 protrude from the partial divider wall 62A into the inner chamber 61. Moreover, a respective crosswise groove 75 is formed in the partial divider wall 62A, respectively intersecting and adjoining the middle of each lengthwise receiver groove 751. The center of each butt connector 71 is secured by a tying band or collar 74, which is respectively received in the crosswise groove 75 so as to fix and hold the butt connectors 71 in the respective receiver grooves 751. It should further be noted that the positions of the three butt connectors 71 received in the grooves 751 coincide with or are axially aligned with the three guide holes 183 extending through the massive housing end block 63'.

The non-offset region or portion of the heater band 2 is stripped or de-insulated using any known technique, in order to expose the electrical conductors of the heater band 2. In this context, an end portion of the outer sheath 161 that jackets and encloses the outside of the heater band 2 is removed or cut back, and the braided protective conductor 84 is exposed. Next, the current-carrying conductors 82 are respectively exposed by removing the inner sheath 13 that covers them. Also, at this stage or initially, the heater band 2 may be cut or shortened to the required length for the installation. The exposed strands of the braided protective conductor 84 may now, or previously already, be combed out and twisted together in such a manner that the twisted end may then be connected to the end crimping zone of one of the butt connectors 71 without problems. Then, this transition or connection zone is coated and surrounded with an adhesive potting compound 19, and a shrinkable tube 15 is shrunk onto the braided protective conductor at least at a partial area over or around the inner sheath 13, so as to seal and electrically insulate this transition area.

Next, the stripped or de-insulated end portions of the electrical conductors of the extension cable 3 as well as the connection ends of the two current carrying conductors 82 of the heater band 2 are inserted in the respective butt connectors 71, which are then each respectively crimped to provide the necessary connections. Preferably, the current carrying conductors 82 are positioned laterally with the protective conductor 84 arranged centrally therebetween, when connected to the respective connectors 71. Thereafter, the crimped connectors 71 are inserted or positioned into the receiving grooves 751 and the heater band 2 and the extension cable 3 are respectively arranged in the housing lead-in openings 64, in the case of the openings 64 being embodied as open grooves. Alternatively, in the case of the openings 64 being embodied as bore holes, the step of passing the heater band and the extension cable therethrough is carried out before making the crimp connections or even before stripping the conductors.

Furthermore, the free ends of the electrical conductors of the extension cable 3 are crimp-connected to the respective pin contacts 722. All of the respective crimp connections involve a so-called permanent or non-removable electrical connection of stripped or exposed ends of the respective electrical conductors. On the other hand, the pin and socket contacts, and other known types of contacts or connections, provide removable or temporary electrical connections. As used herein, the terms "permanent" and "non-removable" relate to connections that can only be taken apart using tools, whereby the connection becomes damaged or is not directly re-connectable. On the other hand, "temporary" and "removable" relate to connections that can be disconnected and reconnected as desired, either by hand or using appropriate tools, without damaging the connectors or rendering the connectors unreusable.

The installation of the heater band 2 and the extension cable 3 proceeds in the following manner. An adhesive potting compound 19 is separately applied onto at least the areas of the connections between the respective electrical conductors and the individual butt connectors 71, so as to seal these connection regions from all sides against the penetration of moisture or liquid, to help ensure that all sealing requirements can be met even under conditions of extreme low pressure. Next, the housing cover or lid is placed or arranged on the housing underpart 66 so as to enclose the open inner chamber 61 of the housing underpart 66. Then the housing cover and the housing underpart 66 are securely connected to each other in a force-locking manner, for example by plastic welding of the plastic components, or by screws that pass through holes in the lid and engage threadings provided in the floor of the housing underpart 66, or by means of a clamping member such as a clamp bail that externally clamps the housing cover onto the housing underpart 66, as has already been mentioned above.

After the housing 6 has been closed, the inner chamber 61 thereof is filled under pressure with an adhesive potting compound 19 through the fill hole 181, which for example passes through the floor of the housing underpart 66 at a suitable location. This pressurized filling process is continued until the adhesive potting compound 19 flows without bubbles out of the venting hole 182 after the passage of a certain amount of time. The venting hole 182 may similarly pass through the floor of the housing underpart 66 at a suitable location, or alternatively may be provided as a hole through the housing cover. In any event, the filling hole 181 and the venting hole 182 should be respectively positioned to ensure complete filling of the housing inner chamber 61 by the potting and sealing compound 19, without entrapping air pockets or bubbles therein.

In the end result achieved by the above procedure, the inner space 61 is completely filled by the adhesive potting and sealing compound 19, whereby this compound 19 encloses, seals and surrounds all sides of the butt connectors 71, which were already pretreated with potting compound 19, as well as the connection portions of the electrical conductors respectively connected to the butt connectors 71, the offset connection region or portion and the outer sheath 161 of the heater band 2 reaching into the inner chamber 61 of the housing 6, and the electrical conductors of the extension cable 3 reaching into the inner chamber 61 of the housing 6. The adhesive potting compound 19 similarly permeates to the end wall region of the housing end block 63' through which the conductors of the extension cable 3 have been inserted. The potting compound 19 thus can permeate from the inside into any remaining gaps in the guide holes 183, while the housing lead-in opening provided with external recesses 184 may additionally be sealed with potting compound 19 from the outside as has already been discussed above. After completing these sealing measures, the connection housing 6 has been completely sealed from the inside against the penetration of moisture or liquid even under extreme low pressure conditions to which the connection module 5, 51 or 52 may be subjected, in order to help ensure that all sealing requirements are met.

According to one alternative embodiment, the housing cover only extends over the hollow inner chamber 61 of the housing 6 and does not cover or overlap the end blocks 63'. In this case, the lead-in openings 64 through the end blocks 63' must be through-going bored holes. According to another alternative embodiment, the housing cover has the same length as the housing underpart, i.e. the cover extends over the entire length of the connection module 5 including the end blocks 63 or 63', whereby the housing lead-in openings 64 and especially the guide holes 183 for the electrical conductors of the extension cable 3 are embodied as open grooves with an open side of the grooves facing the housing cover. Once it is installed, the housing cover thus closes the open side of these grooves.

The example embodiment of a connection module 5, 51 or 52 shown in FIG. 4 is, for example, particularly the connection module 52 of the arrangement shown in FIG. 2, but relates to any one of the other connection modules as well. This embodiment has a construction that is generally similar to that described above with reference to FIG. 3, but differs from that embodiment in the manner of connecting the heater band 2 to the extension cable 3 using respective connector elements 7 in the open inner space of the connection housing 6.

FIG. 4 shows an individual connection module 5, 51 or 52, permanently connected to a heater band 2, and with an extension cable 3 externally and removably connected to the connection module. For example, this connection module is the second connection module 52 of the first heating conductor arrangement 14 shown in FIG. 2, which is connected by the conductors of the extension cable 3 to the coupling element 42. This coupling element 42 in turn can be connected to the on-board electrical power supply system of the aircraft (which is not shown), or to the first connection module of the next heating conductor arrangement 14n as shown in FIG. 2. In this manner, the coupling element 42 provides the electrical connection between the heater unit 14 and the on-board electrical system of the aircraft, or between the heater unit 14 and the next heater unit 14n. Alternatively, the present embodiment of a connection module may be used in the arrangement of FIG. 1, particularly for example as the first connection module 51 of the second heater unit 12 as described above.

In this example embodiment, any known heater band such as a self-limiting parallel heater band can be used as the heater band 2, 21 or 22, whereby the particular construction of the heater band may be as described above. The connection module 5, 51 or 52 according to FIG. 4 comprises the above mentioned quadratic block-shaped connection housing 6 including an open housing underpart 66 having a massive housing end block 63 arranged at one end thereof. This housing end block 63 is an integrally formed component of the housing underpart 66, while the interior surface of the housing end block 63 facing the inner chamber of the housing underpart 66, as well as the housing inner wall 62, bound the open inner space 61. The end of the housing underpart 66 opposite the end block 63 is a simple end wall 62'. Respective housing lead-in openings 64 are provided to penetrate through the housing end block 63 and the end wall 62' at the opposite ends of the housing underpart 66 so as to open into the inner chamber 61 of the housing 6. The heater band 2 is guided and inserted through the housing lead-in opening 64 through the end wall 62' into the inner chamber 61 of the housing underpart 66. The housing end block 63 at the end of the housing underpart 66 opposite from the end wall 62' has three contact chambers provided therein, respectively in the form of holes extending in a direction parallel to the lengthwise axis of the housing and being respectively spaced apart laterally from one another. A respective socket contact 73 and a respective pin contact 721 are received in each one of the respective contact chambers.

The socket contact 73 is embodied as a part or extension of a crimpable connector element 7, having a tying band or collar 74 as well as a crimpable end portion or zone, whereby at least the crimpable zone or portion at one end of the socket contact 73 protrudes from the housing end block 63, i.e. from the respective contact chamber, into the open inner chamber 61 of the housing underpart 66. In the same manner as described above with reference to FIG. 3, the collar 74 and the crimpable portion of the socket contact 73 are received in a crosswise groove 75 and in a lengthwise receiving groove 751 respectively, wherein these components are respectively fixed. A respective retaining ring or clip 76 is arranged around the collar 74 of each respective socket contact 73 in order to secure or retain the socket contact 73 in position. In this secured position, the socket sleeve of each individual socket contact 73 is guided in the respective contact chamber.

A respective pin contact 721 is crimped onto the respective end of each electrical conductor of the three-conductor extension cable 3, whereby this crimped connection of the pin contact 721 is a removable connection using a suitable tool. The pin contacts 721 are inserted respectively into the individual contact chambers and connected respectively to the individual socket contacts 73. In other words, the extension cable 3 is connected to the connection module 5, 51, or 52 by plugging the pin contacts 721 into the respective socket contacts 73. The respective pin contacts 721 are then each locked or secured in the respective contact chambers using the above mentioned retaining rings or clips 76. From the outside, the conductors of the extension cable 3 exiting from the housing underpart 66 are sealed by means of a sealing pillow or pad, such as a rubber sealing pad 20 having holes therein, through which the conductors of the extension cable 3 pass into the housing 6.

Within the housing 6, the connection of the individual electrical conductors of the heater band 2 to the respective corresponding socket contacts 73 can be carried out in the same manner as described above with reference to FIG. 3. In this context, the respective conductor strands of the ends of the respective conductors are stripped or exposed by removing the respective insulation, and these conductor strands are preferably tinned. The exposed conductor strands at the ends of the conductors are inserted into the crimpable portions of the respective socket contacts 73, which are then crimped to secure the socket contacts onto the ends of the conductors. At this point, or even before the crimping is carried out, the socket contacts are inserted into the respective grooves 751 in the open housing underpart 66.

The present example embodiment according to FIG. 4 is also carried out using a pretreatment of prescribed connection zones with an adhesive potting and sealing compound 19, in the same manner and according to the same technique as has been described above with reference to FIG. 3. Also, similarly as in the above embodiment, the housing cover or lid is sealed and secured onto the housing underpart 66, for example by plastic welding such as ultrasonic welding along the rim of the housing cover. Also similarly as above, the inner chamber 61 of the closed housing 6 is then filled with an adhesive potting compound 19 in order to achieve the desired complete sealing of the connection housing 6 against penetration by moisture and liquid even under the prophylactically assumed extremely low pressure conditions to which the connection module may be exposed during operation.

FIG. 5 represents an example embodiment of a single intermediate connection module 53 that permanently and non-removably connects two heater bands 21 and 22 directly to each other within one heater unit or arrangement 14. This connection module 53 may, for example be the third connection module 53 of the third heating conductor arrangement 14 shown in FIG. 2, wherein the first heater band 21 is further connected to the first connection module 51 at the input end, and the second heater band 22 is further connected to the second connection module 52 on the output end of the third heating conductor arrangement or heater unit 14. In this context, the first and second connection modules 51 and 52 or 52' of the third heating conductor arrangement 14 may be embodied according to either FIG. 3 or FIG. 4. It is further noted that any desired number of the heater units 1, 12 and 14 embodied according to FIGS. 1 to 3 can be coupled together using electrical coupling elements 42 to form a heater unit chain including up to the nth heater unit 14n as needed or desired for a particular installation, for example to protect a water supply piping system in an aircraft against freezing.

The connection module 53 according to FIG. 5 also comprises the above described quadratic block-shaped connection housing 6. The housing inner wall 62 of the housing underpart 66 substantially uniformly bounds the open space of the inner chamber 61 of the connection housing 6 of the connection module 53. In other words, the housing 6 in this embodiment of FIG. 5 does not include one or two massive housing end blocks 63 or 63' as do the embodiments according to FIGS. 3 and 4. In the present embodiment, the two opposite ends of the housing underpart 66 each have a similarly configured housing lead-in opening 64 formed in the outer end surfaces thereof, whereby these lead-in openings 64 pass through the housing wall into the inner space of the housing substantially parallel to the housing lengthwise axis. The two heater bands 21 and 22 are respectively passed into the housing through the respective lead-in openings at opposite ends of the housing, such that the offset or stepped-down, i.e. stripped or de-insulated, portion of each individual heater band 21 and 22 is located in the open space of the inner chamber 61 of the housing underpart 66.

Three butt connectors 71 are arranged in the housing underpart 66 substantially in the manner as shown and described in connection with FIG. 3. Namely, a partial dividing wall or protrusion 62A protrudes inwardly into the inner space 61 from the housing wall 62, substantially at the lengthwise center thereof. Three respective lengthwise grooves 751 are arranged laterally adjacent and spaced apart from one another in the partial dividing wall or protrusion 62A, and three respective crosswise grooves 75 are arranged to intersect and adjoin the three lengthwise grooves 751. The three crimpable butt connectors 71 having collars 74 at mid-length are received in the respective grooves 751 and 75, such that the connectors 71 extend parallel to the axis of the housing and are located spaced apart from one another substantially along the central plane intersecting the length of the housing.

The respective connections of the individual electrical conductors of the two heater bands 21 and 22 to the respective butt connectors 71 are carried out in the same manner as described above with reference to FIG. 3. In this context, the conductor ends of the first and second heater bands 21 and 22 are directed through the opposite housing lead-in openings 64 into the inner chamber 61 of the housing underpart 66, and then the conductor strands are exposed and tinned, and then inserted into and crimpingly connected to the respective crimpable ends of the butt connectors 71, before the crimped connectors 71 are then inserted into the receiving grooves. Particularly, the two protective conductors 84 that do not normally carry a current during operation of the two heater bands 21 and 22 are first processed by combing out and then twisting the braided strands thereof, and then these strands are connected to the centrally arranged butt connector 71, i.e. the butt connector 71 extending substantially along the axis of the housing. On the other hand, the current carrying conductors 82 of the two heater bands 21 and 22 are separately connected to the two laterally out-board or radially spaced butt connectors 71.

The particularly prescribed locations, such as the connection transition areas, are then pretreated by being coated with the adhesive potting compound 19 by the same technique that has been described above with reference to FIG. 3. Also similarly as described above, the housing is then closed by sealing and securing the housing cover onto the housing underpart 66, and then the closed inner chamber 61 of the housing is filled with the adhesive potting compound 19 through a fill hole 181 while venting through a vent hole 182. In this manner, the entire housing interior space is completely sealed against the penetration of moisture or liquid, surely and reliably even under prophylactically assumed conditions of extreme low pressure to which the connection module may be subjected during operation.

This embodiment of the intermediate connection module 53 according to FIG. 5 is especially useful for carrying out repairs of a heater band 2 that has suffered an electrical failure or disruption such as a short-circuit, or a mechanical damage. In such a case, the installed heater band 2 is simply cut to remove the localized damaged portion from the rest of the heater band 2, and then the connection module 53 is simply inserted and interconnected at the cutting location so as to interconnect the two remaining functional portions of the heater band 2. In this manner, the failed or damaged heater band 2 can be repaired, in effect by simply replacing the damaged portion of the heater band 2 with the connection module 53, while the heater band 2 remains in its installed position and arrangement.

Generally, this type of electrical coupling provided by the intermediate connection module 53 may be arranged between any successive two adjacent heater bands, to permanently interconnect any desired number of heater bands within a respective heater unit or heating conductor arrangement.

The electrical conductors of the extension cable 3 connected to the respective input and output sides of the respective connection modules 5 of the respective heater units 1, 12, 14 and 14n are respectively connected permanently and non-removably to the crimped pin contacts 721, which in turn are connected removably to the respective through-contact connector socket 17 or the respective coupling element 42. Furthermore, the connections of the current-carrying conductors are additionally secured and made non-disconnectable by shrinking a shrinkable tubing over the connection between the outer sheath surface of the through-connect socket 17 and the outer sheath of the extension cable 3. The shrink-fit shrinkable tubing serves to prevent the disconnection or loosening of the electrical connection, without damaging or removing the shrinkable tubing and using a tool. In this manner, the possibility of contacting a loosened or disconnected electrical connection is avoided.

The electrical coupling element 42 is embodied in an at least one-poled configuration. Alternatively, it may have a multipoled configuration. In this context, the electrical coupling element 42 comprises one or more through-connect sockets 17 that may be integrated together, or that may be freely or self-supportingly and independently movable.

The construction of the extension cable 3 depends on and correlates with the construction of the particular heater band 2 being used in any particular application. The extension cable 3 thereby includes, at a minimum, a single current-carrying conductor 81. However, in the most common application, the extension cable 3 includes two flexible current-carrying electrical conductors 81, and a flexible protective electrical conductor 83 that does not usually carry current during operation of the system.

All of the connection elements 7 installed in the system, or particularly in the individual connection modules 5, 51 and 52 or 52', and particularly the butt connectors 71, as well as the socket contacts 73 and pin contacts 721, are embodied with a terminated or blind hole extending in the lengthwise direction of the crimpable zone thereof. In other words, the respective connector elements 7 do not have a continuous through-going hole. In this manner, any moisture or liquid that may reach the crimped zone of the connector element is prevented from flowing further and instead is retained, because the connector element does not provide a continuous capillary effect allowing the moisture or liquid to flow by capillary action entirely through the connector element 7.

All of the heating conductor arrangements or heater units 1, 12 and 14 that are electrically coupled together form a so-called heating conductor chain. The heater bands 2, 21 or 22 of the heater units 1, 12 or 14 of this heating conductor chain are mounted on and along any conduits or equipment and accessories that are subject to freeze damage, such as the waste water pipes and water supply pipes in an aircraft. This connection and mounting can be carried out in any known manner. At least one of the heating conductor arrangements 1, 12, 14 or 14n which is at a respective end of the heating conductor chain, is electrically coupled to the on-board power supply network of the aircraft, to be provided with electrical power therefrom. The heater band 2 at the opposite free end of the heating conductor chain that is not connected to the power supply network is instead terminated with a heater band end cap in a manner that has already been described above.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A heater system comprising a plurality of heater units, at least one electrical coupling element, and a plurality of extension cables respectively connected to said heater units and said electrical coupling element so as to interconnect said heater units, wherein each said heater unit comprises at least one heater band and a respective connection module connected to an end of said heater band, each said connection module comprises a housing with an inner chamber therein and two lead-in openings passing through said housing into said inner chamber, at least one electrical connector element arranged in a receiving groove provided within said housing, and a sealing compound filling a hollow space in said inner chamber, each said heater band comprises at least one heating conductor and an outer sheath jacketing said heating conductor except for at least one exposed connection end of said heating conductor, each said extension cable comprises at least one extension conductor and an insulating sheath jacketing said extension conductor except for at least one exposed connection end of said extension conductor, said heating conductor and said extension conductor respectively pass through said two lead-in openings into said housing, and said respective exposed connection ends of said heating conductor and said extension conductor are respectively connected to said electrical connector element whereby said heating conductor and said extension conductor are electrically connected to each other by said electrical connector element, and said sealing compound in said inner chamber surrounds and seals at least one connection area at which one of said exposed connection ends is respectively connected to said electrical connector element, any portion of said exposed connection ends exposed outside of said electrical connector element in said inner chamber in said housing, and any portion of said electrical connector element protruding from said receiving groove into said inner chamber in said housing.

2. The heater system according to claim 1, further in combination with an aircraft in which said heater system is installed.

3. The heater system according to claim 2, wherein said aircraft includes a fuselage and a liquid-conveying pipe system arranged in said fuselage, and wherein said at least one heater band of said at least one heater unit is arranged and secured on said pipe system of said aircraft.

4. The heater system according to claim 2, wherein said aircraft includes a fuselage and an on-board electrical power supply network, wherein said heater units interconnected by said extension cables and said at least one electrical coupling element form a heating conductor chain, wherein a terminal one of said heater units is at an end of said chain, wherein said terminal heater unit further comprises an additional terminal one of said connection modules connected to a terminal end of said at least one heater band of said terminal heater unit, and wherein said terminal connection module is connected to said on-board electrical power supply network to provide electrical power to said heating conductor chain.

5. The heater system according to claim 1, wherein a first one of said lead-in openings is configured and adapted to receive an entire outer dimension of said heater band passing therethrough, and a second one of said lead-in openings is configured and adapted to receive only said extension conductor individually passing therethrough.

6. The heater system according to claim 1, wherein said at least one electrical connector element comprises a respective crimp connector, and said connection area comprises a respective crimped portion of said crimp connector.

7. The heater system according to claim 6, wherein said housing comprises a housing underpart and a housing cover that is securely connected to said housing underpart, said lead-in openings are formed through respective walls of said housing underpart, said receiving groove is provided in a respective wall of said housing underpart, and at least said crimped portion of said crimp connector protrudes into said inner chamber and is surrounded by said sealing compound.

8. The heater system according to claim 1, wherein at least a portion of said electrical connector element is at least partially surrounded by said sealing compound.

9. The heater system according to claim 1, wherein said housing further has at least one recess formed on an exterior surface thereof, and wherein said recess is filled with said sealing compound.

10. The heater system according to claim 9, wherein said recess adjoins at least one of said lead-in openings.

11. The heater system according to claim 1, further comprising a pin contact fitted on said exposed connection end of said extension cable, wherein said pin contact is received in said electrical connector element to removably connect said extension cable to said connection module.

12. The heater system according to claim 1, wherein said exposed connection end of said extension cable is permanently and non-removably connected to said electrical connector element.

13. The heater system according to claim 1, wherein each said extension conductor of each said extension cable further includes a free end opposite said exposed connection end, and wherein each said free end is permanently and non-removably connected to said electrical coupling element.

14. The heater system according to claim 1, wherein said electrical coupling element comprises a socket connector, wherein each said extension conductor of each said extension cable further includes a free end opposite said exposed connection end, and wherein each said free end is removably plugged into said socket connector of said electrical coupling element.

15. The heater system according to claim 1, wherein at least one of said heater units comprises two of said heater bands and further comprises an intermediate connection module respectively permanently connected to and interconnecting said two heater bands,
wherein said intermediate connection module comprises a housing with an inner chamber therein and two lead-in openings passing through a wall of said housing into said inner chamber, at least one electrical connector element arranged in a receiving groove provided within said housing, and a sealing compound filling a hollow space in said inner chamber,
wherein said heating conductors of said two heater bands respectively pass through said two lead-in openings into said housing of said intermediate connection module, and respectively have further exposed connection ends that are connected to said electrical connector element in said housing of said intermediate connection module, whereby said heating conductors of said two heater bands are electrically connected to each other by said electrical connector element, and
wherein said sealing compound in said inner chamber of said housing of said intermediate connection module surrounds and seals at least two connection areas at which said further exposed connection ends are respectively connected to said electrical connector element of said intermediate connection module, any portion of said further exposed connection ends exposed outside of said electrical connector element in said inner chamber in said housing of said intermediate connection module, and any portion of said electrical connector element protruding from said receiving groove into said inner chamber in said housing of said intermediate connection module.

16. The heater system according to claim 1, wherein each said heater band is a resistance heater band, said heating conductor is a resistive heating conductor, and said heater band respectively includes only a single said heating conductor.

17. The heater system according to claim 1, wherein each said heater band is a parallel heater band respectively including at least two of said heating conductors.

18. The heater system according to claim 1, wherein each said heater band has a flat cross-sectional shape.

19. The heater system according to claim 1, wherein each said heater band has a round cross-sectional shape.

20. The heater system according to claim 1, wherein each said heater band is a self-limiting heater band adapted to operate in a self-limiting manner in a limited temperature range.

21. The heater system according to claim 1, wherein each said extension cable comprises three of said extension conductors, wherein two of said three extension conductors are adapted to carry an operating current during normal operation of said heater system and a third one of said three extension conductors is adapted to be a protective conductor that does not carry a current during normal operation of said heater system.

22. The heater system according to claim 1, wherein each said electrical coupling element is a respective multi-poled electrical coupling element.

23. The heater system according to claim 1, wherein each said electrical coupling element comprises at least one through-connect socket integrated into a single unit.

24. The heater system according to claim 1, wherein each said electrical coupling element comprises at least one through-connect socket that is movably arranged and connected only to said extension cables.

25. The heater system according to claim 1, wherein said housing further has a crosswise groove provided therein so as to perpendicularly intersect said receiving groove, said electrical connector element is a butt connector including two crimpable connection portions at opposite ends thereof and a collar centrally between said crimpable connection portions, said crimpable connection portions are at least partially received in said receiving groove, and said collar is received and secured in said crosswise groove.

26. The heater system according to claim 25, wherein said receiving groove extends parallel to a lengthwise axis of said housing of said connection module.

27. The heater system according to claim 1, wherein said housing includes a housing wall and at least one massive end block at an axial end thereof, said end block has a thickness greater than said housing wall, and said end block has at least one of said lead-in openings therein and a plurality of contact chambers formed therein respectively extending axially from said at least one lead-in opening to said at least one receiving groove.

28. The heater system according to claim 27, wherein each said electrical connector element respectively comprises a socket contact, a crimpable connection portion, a collar between said socket contact and said crimpable connection portion, and a retaining clip secured around said collar, and wherein said socket contact of each said electrical connector element is received in a respective one of said contact chambers, and said crimpable connection portion protrudes from said receiving groove into said inner chamber of said housing.

29. The heater system according to claim 27, further comprising a plurality of socket contacts or pin contacts respectively arranged in said contact chambers.

30. The heater system according to claim 29, wherein said socket contacts are respectively arranged in said contact chambers, each said extension cable further comprises a pin contact secured to said exposed connection end of said extension conductor of said extension cable, and said pin contact of each said extension cable is received in a respective one of said socket contacts so as to provide said connection between said exposed connection end a of said extension conductor and said electrical connector element.

31. The heater system according to claim 1, further comprising a seal pad arranged at an end of said housing adjacent one of said lead-in openings, with said extension cable passing sealedly through said seal pad into said lead-in opening.

32. The heater system according to claim 1, wherein said electrical connector element includes at least one axially directed blind connection hole therein, and does not include an axially through-going hole so as to avoid the formation of a liquid conveying capillary extending entirely axially through said electrical connector element.

33. The heater system according to claim 1, wherein said sealing compound is an adhesive sealant that is adhesive, sealing, thermally insulating, and electrically insulating.

34. The heater system according to claim 33, wherein said sealing compound is a two-component, pourable or injectable, curable potting compound comprising at least one of polyamides and epoxies, that is poured or injected into said housing.

35. The heater system according to claim 1, wherein said housing comprises a plastic housing underpart including housing walls and at least one massive end block that is thicker than said housing walls and that is located at an axial end of said housing underpart, and a plastic housing cover having a length shorter than that of said housing underpart in an axial direction of said housing, wherein said housing cover is sealed and secured on said housing underpart so as to cover and close said inner chamber without covering and without overlapping said massive end block.

36. The heater system according to claim 1, wherein said housing comprises a plastic housing underpart and a plastic housing cover having a length equal to that of said housing underpart in an axial direction of said housing, wherein said housing cover is arranged on said housing underpart so as to cover and close said inner chamber.

37. The heater system according to claim 36, wherein said housing includes a housing wall and at least one massive end block at an axial end thereof, said end block has a thickness greater than said housing wall, said end block has at least one of said lead-in openings therein and a plurality of contact chambers formed therein respectively extending axially from said at least one lead-in opening to said at least one receiving groove, said contact chambers are configured as grooves each having one open side therealong through said end block, said housing cover overlaps and covers said end block so as to cover said open sides of said grooves of said contact chambers, and said housing cover is welded onto said housing underpart along an edge of said housing wall and said end block.

* * * * *

UNITED STATES PATENT AND TRADEMARK OFFICE
CERTIFICATE OF CORRECTION

PATENT NO. : 5,998,772

DATED : Dec. 7, 1999

INVENTOR(S) : Kirma et al.

It is certified that error appears in the above-identified patent and that said Letters Patent is hereby corrected as shown below:

Col. 10, line 57, after "block" replace "63" by --63'--;

Col. 12, line 53, after "block" insert --63 or--;

Col. 13, line 1, after "blocks" insert --63 or--;

Col. 13, line 3, before "63' " insert --63 or--;

Signed and Sealed this

Twenty-seventh Day of June, 2000

*Attest:*

Q. TODD DICKINSON

*Attesting Officer*     *Director of Patents and Trademarks*